United States Patent
Kim et al.

(10) Patent No.: US 11,572,728 B2
(45) Date of Patent: Feb. 7, 2023

(54) APPARATUS AND METHOD OF CONTROLLING DOOR FOR VEHICLE

(71) Applicants: Hyundai Motor Company, Seoul (KR); Kia Motors Corporation, Seoul (KR)

(72) Inventors: Duck Young Kim, Hwaseong-si (KR); Jung Hoon Park, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 343 days.

(21) Appl. No.: 16/824,921

(22) Filed: Mar. 20, 2020

(65) Prior Publication Data

US 2021/0115720 A1  Apr. 22, 2021

(30) Foreign Application Priority Data

Oct. 16, 2019  (KR) .................. 10-2019-0128352

(51) Int. Cl.
*E05F 15/00* (2015.01)
*E05F 15/40* (2015.01)
*B60J 5/10* (2006.01)
*E05F 15/70* (2015.01)

(52) U.S. Cl.
CPC ............... *E05F 15/40* (2015.01); *B60J 5/105* (2013.01); *E05F 15/70* (2015.01); *E05Y 2400/54* (2013.01); *E05Y 2600/46* (2013.01); *E05Y 2900/546* (2013.01)

(58) Field of Classification Search
CPC . E05F 15/73; E05F 15/40; E05F 15/70; E05F 2015/432; E05F 2015/483; B60J 5/105; E05Y 2400/54; E05Y 2600/46; E05Y 2900/546

USPC .................................. 701/49; 49/31
See application file for complete search history.

(56) References Cited

U.S. PATENT DOCUMENTS

| | | | | |
|---|---|---|---|---|
| 5,689,160 A * | 11/1997 | Shigematsu | ............ | E05F 15/41 318/281 |
| 5,977,732 A * | 11/1999 | Matsumoto | .......... | H02H 7/0851 318/434 |
| 6,794,837 B1 * | 9/2004 | Whinnery | ............... | E05F 15/41 318/266 |
| 7,052,073 B2 * | 5/2006 | Ichinose | ................. | E05F 15/40 49/168 |
| 7,288,907 B2 * | 10/2007 | Kamiya | ..................... | B60J 5/06 318/446 |
| 7,928,678 B2 * | 4/2011 | Imai | .......................... | B60J 5/06 49/324 |
| 11,384,588 B2 * | 7/2022 | Soderqvist | ............. | E05F 15/70 |

(Continued)

FOREIGN PATENT DOCUMENTS

| KR | 20160146400 A | 12/2016 |
|---|---|---|
| KR | 20190069645 A | 6/2019 |

*Primary Examiner* — Chi Q Nguyen
(74) *Attorney, Agent, or Firm* — Slater Matsil, LLP (57) ABSTRACT

An apparatus can be used to control a door for a vehicle. A sensor unit is provided in the door and is configured to sense an object adjacent to a region outside of the door. A controller is configured to calculate a distance at which the object is positioned based on a signal received from the sensor unit and to control the door to be opened while the distance to the object is gradually reduced in a state where the door is closed, such that the object is sensed within a predetermined range.

18 Claims, 5 Drawing Sheets

(56) References Cited

U.S. PATENT DOCUMENTS

| | | | |
|---|---|---|---|
| 2016/0010381 A1* | 1/2016 | Wuerstlein | E05F 15/46 |
| | | | 701/49 |
| 2018/0163454 A1* | 6/2018 | Motoki | E05B 83/36 |
| 2018/0170309 A1* | 6/2018 | McMahon | B60Q 1/50 |
| 2019/0128040 A1* | 5/2019 | Mitchell | E05F 15/40 |
| 2020/0235695 A1* | 7/2020 | Asano | E05F 1/10 |
| 2020/0284876 A1* | 9/2020 | Hurd | G01S 7/414 |

* cited by examiner

- STEP 1(A): 0~7cm
- STEP 2(B): 7~13cm
- STEP 3(C): 13~20cm

[FIG. 4]

- STEP 1(D): 0~20cm
- STEP 2(E): 20~50cm
- STEP 3(F): 50~70cm

[FIG. 5]

APPARATUS AND METHOD OF CONTROLLING DOOR FOR VEHICLE

CROSS-REFERENCE TO RELATED APPLICATIONS

This application claims priority to Korean Patent Application No. 10-2019-0128352, filed on Oct. 16, 2019, which application is hereby incorporated herein by reference.

TECHNICAL FIELD

The present disclosure relates to an apparatus and a method of controlling a door for a vehicle.

BACKGROUND

A tailgate of a vehicle refers to a rear gate of a sports utility vehicle (SUV), a pickup truck or the like, and has been recently mounted with a system of warning a user that the tailgate may be safely opened together with a function of opening and closing the tailgate in an electric manner.

However, a safety opening warning system of the tailgate generally interworks with a rear parking sensor to sense only an obstacle in a horizontal direction adjacent to a bumper, such that it is difficult to sense an obstacle in a vertical direction in which the tailgate is opened, and the safety opening warning system and a tailgate switch are independently installed, which is disadvantageous in terms of cost and weight.

Meanwhile, in a case of a vehicle in which a rear license plate of the vehicle is positioned in the tailgate, the tailgate switch is installed in a concavely recessed portion on the license plate.

However, in a case of a vehicle in which a rear license plate is positioned in a rear bumper, a space in which the tailgate switch is installed in a hidden state may not be separately provided on a rear panel, such that it is difficult to configure the tailgate switch.

The tailgate switch may be installed in a state where it is directly exposed to an outer surface of the vehicle, but in this case, the tailgate switch may be easily contaminated, such that user's will to operate the tailgate switch is reduced.

The contents described as the related art have been provided only to assist in understanding the background of the present disclosure and should not be considered as corresponding to the related art known to those having ordinary skill in the art.

SUMMARY

Embodiments of the present disclosure provide an apparatus and a method of controlling a door for a vehicle capable of opening the door and sensing an obstacle using a sensor capable of sensing an object.

According to an embodiment of the present disclosure, an apparatus of controlling a door for a vehicle includes a sensor unit provided in a door for sensing an object adjacent to the outside of the door. A controller calculates a distance at which the object is positioned on the basis of a signal sensed by the sensor unit and controls the door to be opened in a case where the distance to the object is gradually reduced in a state where the door is closed, such that the object is sensed within a predetermined range.

The door may be a tailgate of the vehicle and the sensor unit may be installed at an emblem mounted on the tailgate.

The sensor unit may be an ultrasonic sensor. The ultrasonic sensor may be installed on a rear surface of the emblem, and ultrasonic waves may be transmitted and received through a logo portion of the center of the emblem.

The controller may include a transmitter transmitting a voltage signal to the ultrasonic sensor, a receiver receiving a voltage signal from the ultrasonic sensor, a calculator calculating the distance to the object depending on a magnitude of the voltage signal received at the receiver, a determiner determining whether or not an operation condition of a tailgate is satisfied on the basis of an opened and closed state of the tailgate and a change in the distance to the object, and a driving controller applying an operation command to control an operation of the tailgate according to the operation condition of the tailgate when the operation condition of the tailgate is satisfied.

The controller may divide and set sensing ranges for each sensing distance of the sensor unit, and control the door to be opened while being unlatched in a case where the object is sequentially sensed from a sensing range distant from the sensor unit to a sensing range close to the sensor unit.

The controller may control the door so that the opening of the door is stopped in a case where the object enters a maximum sensing distance of the sensor unit and is sensed within the maximum sensing distance in a process in which the door is opened.

The controller may control the door so that the opening of the door is continued in a case where the object is not sensed in the maximum sensing range most distant from the sensor unit and is preferentially sensed in the other sensing ranges in the process in which the door is opened.

The controller may set the maximum sensing distance in a state where the door is opened to be longer than that in a state where the door is closed.

The maximum sensing distance of the sensor unit may be changed depending on the number of times of voltage application from the controller, and the controller may increase the number of times of voltage application to the sensor unit in the state where the door is opened as compared with the number of times of voltage application to the sensor unit in the state where the door is closed, such that the maximum sensing distance of the sensor unit becomes long.

The controller may set the maximum sensing distance of the sensor unit to become long when an operation signal of a door operator operating the door is input together with an unlatching signal of a door latch in the state in which the door is closed.

The controller may set the maximum sensing distance of the sensor unit to become long when an unlatching signal of a door latch is input.

The controller may set the maximum sensing distance of the sensor unit to become long when an operation signal of a door operator operating the door is input.

According to another embodiment of the present disclosure, a method of controlling a door for a vehicle includes, a sensing step of sensing, by a sensor unit, an object adjacent to the outside of a door, a calculating step of calculating, by a controller, a distance at which the object is positioned on the basis of a signal sensed by the sensor unit, and an operation controlling step of controlling, by the controller, the door to be opened in a case where the distance to the object is gradually reduced in a state where the door is closed, such that the object is sensed within a predetermined range.

The method of controlling a door for a vehicle may further include, after the calculating step, a range setting step of dividing and setting sensing ranges for each sensing distance of the sensor unit, and wherein in the operation controlling step, in a case where the object is sequentially sensed from a sensing range distant from the sensor unit to a sensing range close to the sensor unit, the door is controlled to be opened.

After the operation controlling step, in a case where the object enters a maximum sensing distance of the sensor unit and is sensed within the maximum sensing distance in a process in which the door is opened, the door may be controlled so that the opening of the door is stopped.

After the operation controlling step, in a case where the object is not sensed in a maximum sensing range most distant from the sensor unit and is preferentially sensed in the other sensing ranges in a process in which the door is opened, the door may be controlled so that the opening of the door is continued.

In the range setting step, the maximum sensing distance in a state where the door is opened may be set to be longer than that in a state where the door is closed.

The maximum sensing distance of the sensor unit may be changed depending on the number of times of voltage application from the controller, and in the range setting step, the number of times of voltage application to the sensor unit in the state where the door is opened may be increased as compared with the number of times of voltage application to the sensor unit in the state where the door is closed, such that the maximum sensing distance of the sensor unit becomes long.

In the range setting step, when an operation signal of a door operator operating the door is input together with an unlatching signal of a door latch in the state in which the door is closed, the maximum sensing distance of the sensor unit may be changed to be long.

In the range setting step, when an unlatching signal of a door latch is input, the maximum sensing distance of the sensor unit may be changed to be long.

In the range setting step, when an operation signal of a door operator operating the door is input, the maximum sensing distance of the sensor unit may be changed to be long.

DETAILED DESCRIPTION OF ILLUSTRATIVE EMBODIMENTS

Hereinafter, a folding personal mobility vehicle according to embodiments of the present disclosure is described with reference to the accompanying drawings.

An embodiment of the present disclosure will be described in detail with reference to the accompanying drawings.

An apparatus of controlling a door for a vehicle according to the present disclosure is configured to include a sensor unit 30 and a controller 100.

Figure 1:
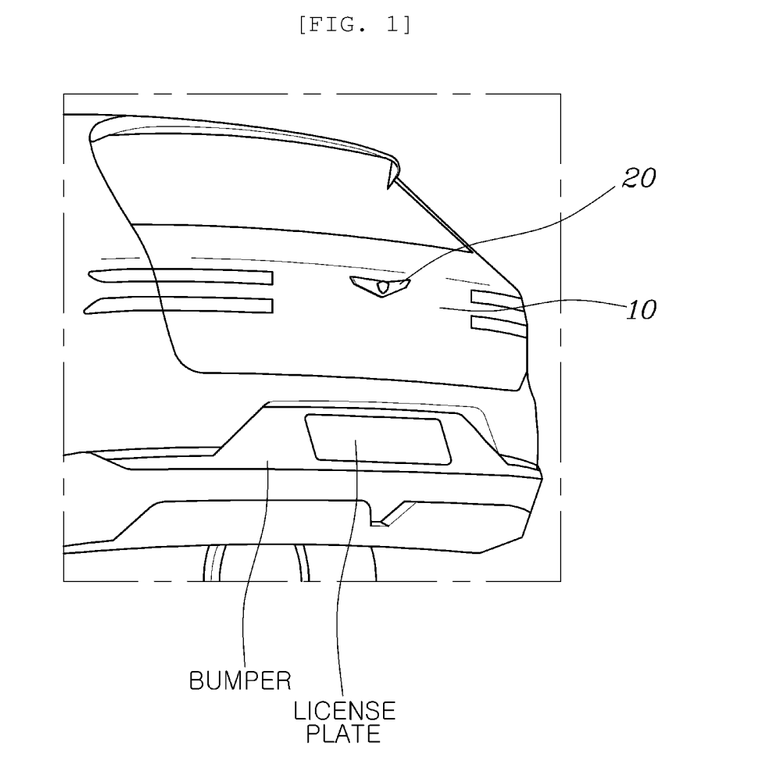
FIG. 1 is a view illustrating a tailgate and an emblem appearance that may be applied to the present disclosure.

The present disclosure will be described in detail with reference to FIG. 1. First, the sensor unit 30 is provided in a door 10, and senses an object adjacent to the outside of the door 10.

The controller 100 calculates a distance at which the object is positioned on the basis of a signal sensed by the sensor unit 30, and controls the door 10 to be opened in a case where the distance to the object is gradually reduced in a state where the door 10 is closed, such that the object is sensed within a predetermined range.

Here, the door 10 may be a tailgate 10 of the vehicle. In addition, the sensor unit 30 may be installed at an emblem 20 mounted on the tailgate 10.

For example, in a vehicle in which a rear license plate is installed in a rear bumper, the emblem 20 of the vehicle may be installed in the middle of the tailgate 10, and the sensor unit 30 may be installed at the emblem 20.

According to such a configuration, in a case where a user's hand is positioned close to the sensor unit 30 in a state where the tailgate 10 is closed, a distance between the sensor unit 30 and the hand that becomes close to the sensor unit 30 is calculated.

Therefore, when the distance between the sensor unit 30 and the hand is within a predetermined distance, the controller 100 applies an unlatching command of a door latch 50 to unlatch the door latch 50, such that the tailgate 10 is unlatched, and applies an operation command of a drive unit to extend the drive unit, such that the tailgate 10 is opened. For reference, the unlatching operation of the tailgate 10 as described above may be configured to be operated only in a case where a smart key is sensed in the vicinity of the sensor unit 30.

As described above, in the present disclosure, the tailgate 10 is unlatched only by a motion of bringing the hand to the vicinity of the sensor unit 30, such that the unlatching operation of the tailgate 10 is easily and conveniently performed and a more luxurious vehicle image is implemented. In addition, the tailgate 10 is unlatched in a non-contact manner without directly touching the sensor unit 30, such that the unlatching operation of the tailgate 10 may be performed without repulsion even in a case where the tailgate 10 is contaminated.

Figure 2:
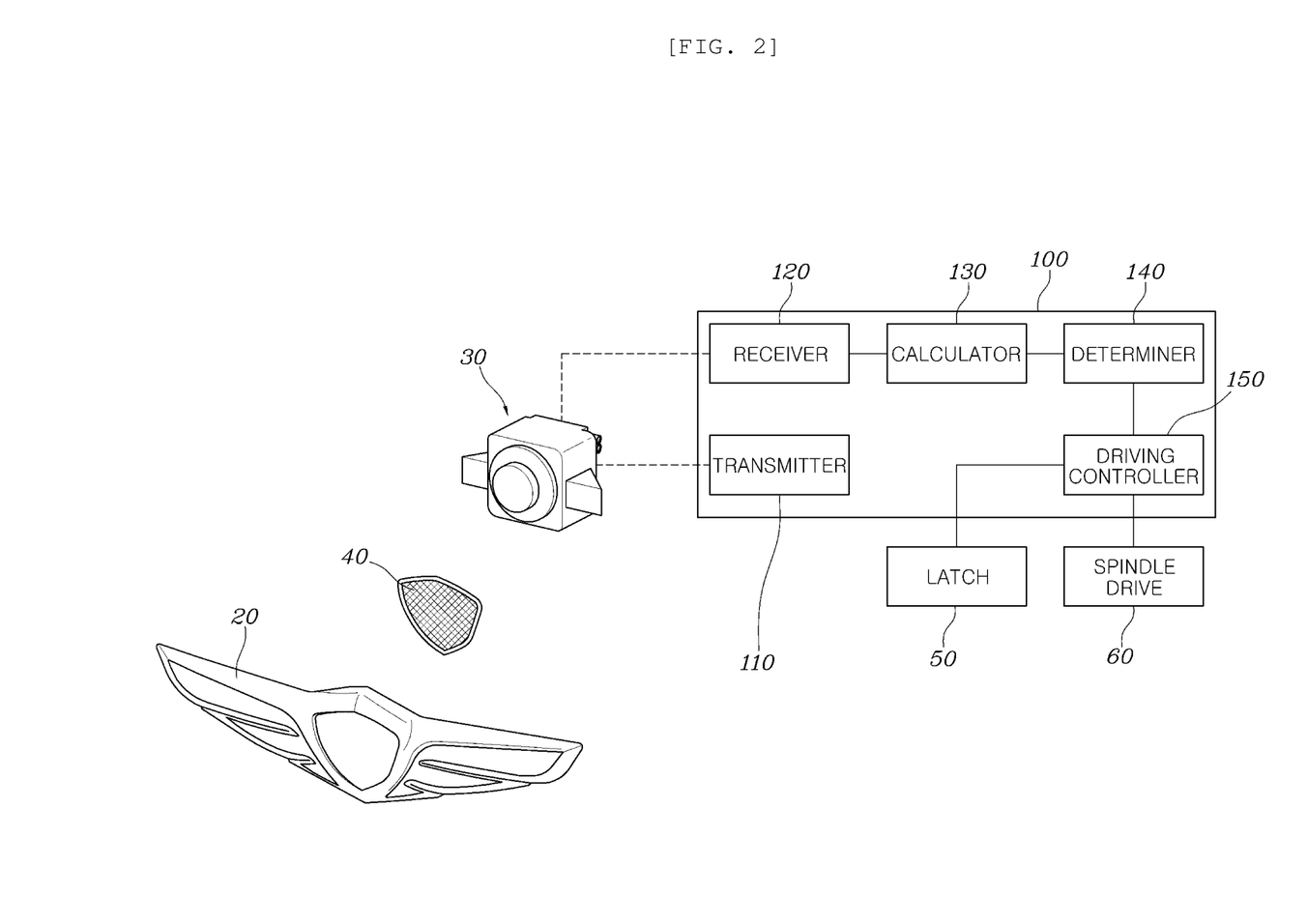
FIG. 2 is a view illustrating a connection relationship between a sensor unit, an emblem and a controller according to the present disclosure.

In addition, the sensor unit 30 according to the present disclosure is an ultrasonic sensor, and the ultrasonic sensor 30 is installed on a rear surface of the emblem 20.

In addition, ultrasonic waves are transmitted and received through a logo portion of the center of the emblem 20.

For example, the ultrasonic sensor 30 is installed so that a rear surface of an ultrasonic reflection plate 40 is adhered to the center of the ultrasonic sensor 30 and a front surface of the ultrasonic reflection plate 40 faces the logo portion of the center of the emblem 20. In addition, both sides of a rear surface of the emblem 20 may be fastened to an outer surface of a panel of the tailgate 10.

Therefore, an electrical signal applied from the controller 100 is applied to the ultrasonic sensor 30 to be converted into vibrations, and the vibrations generated by the ultrasonic sensor 30 are converted into sound waves through the ultrasonic reflection plate 40.

In addition, sound waves sensed outside the ultrasonic reflection plate 40 are converted into vibrations by the ultrasonic reflection plate 40 and are then transferred to the sensor unit 30, and the vibrations input to the sensor unit 30 are received as an electronic signal by the controller 100.

That is, in a case of the vehicle in which the rear license plate is installed in the rear bumper, it is not easy to configure a switch of the tailgate 10 on an outer surface of a panel of the tailgate 10 due to a design of the vehicle, but the present disclosure has an effect that the sensor unit 30 is concealed through the emblem 20 provided on the tailgate 10, such that the switch of the tailgate 10 may be implemented without hindering a rear design of the vehicle.

In addition, the controller 100 is configured to include a transmitter 110 transmitting a voltage signal to the ultrasonic sensor 30, a receiver 120 receiving a voltage signal from the ultrasonic sensor 30, a calculator 130 calculating a distance to an object depending on a magnitude of the voltage signal input to the receiver 120, a determiner (comparator) 140 determining whether or not an operation condition of the tailgate 10 is satisfied on the basis of an opened and closed state of the tailgate 10 and a change in the distance to the object, and a driving controller 150 applying an operation command to control an operation of the tailgate 10 according to the operation condition of the tailgate 10 when the operation condition of the tailgate 10 is satisfied.

For example, in a case where a voltage of 3 V is applied from the transmitter 110, the distance to the object may be calculated to be 0 to 7 cm when a voltage received by the receiver 120 is 0 to 1V, may be calculated to be 7 to 13 cm when a voltage received by the receiver 120 is 1 to 2 V, and may be calculated to be 13 to 20 cm when a voltage received by the receiver 120 is 2 to 3V.

For reference, a distance range to the object may be divided on the basis of a maximum voltage that may be received by the receiver 120, and the distance to the object may be calculated using the voltage received by the receiver 120.

In addition, the operation condition of the tailgate 10 determined by the comparator 140 may be whether or not the distance to the object is gradually reduced in a state where the tailgate 10 is closed.

In addition, the operation condition of the tailgate 10 may be whether or not the object is sensed within a maximum sensing distance that may be sensed by the sensor unit 30 in a state where the tailgate 10 is unlatched.

Therefore, the driving controller 150 may open the tailgate 10 while unlatching the tailgate 10 in a case where the distance to the object is gradually reduced in the state where the tailgate 10 is closed.

In addition, the driving controller 150 may stop the opening of the tailgate 10 in a case where the object is sensed within the maximum sensing distance that may be sensed by the sensor unit 30 in a state where the tailgate 10 is unlatched.

For reference, the controller 100 according to an embodiment of the present disclosure may be implemented through a nonvolatile memory (not illustrated) configured to store an algorithm configured to control operations of various components of the vehicle or data on software instructions reproducing the algorithm and a processor (not illustrated) configured to perform operations described below using the data stored in the nonvolatile memory. Here, the memory and the processor may be implemented as individual chips. Alternatively, the memory and the processor may be integrated with each other and implemented as a single chip. The processor may have a form of one or more processors.

Hereinafter, a configuration of the controller 100 will be described in more detail. The controller 100 may divide and set sensing ranges for each sensing distance of the sensor unit 30, and control the door 10 to be opened while being unlatched in a case where the object is sequentially sensed from a sensing range distant from the sensor unit 30 to a sensing range close to the sensor unit 30.

Figure 3:
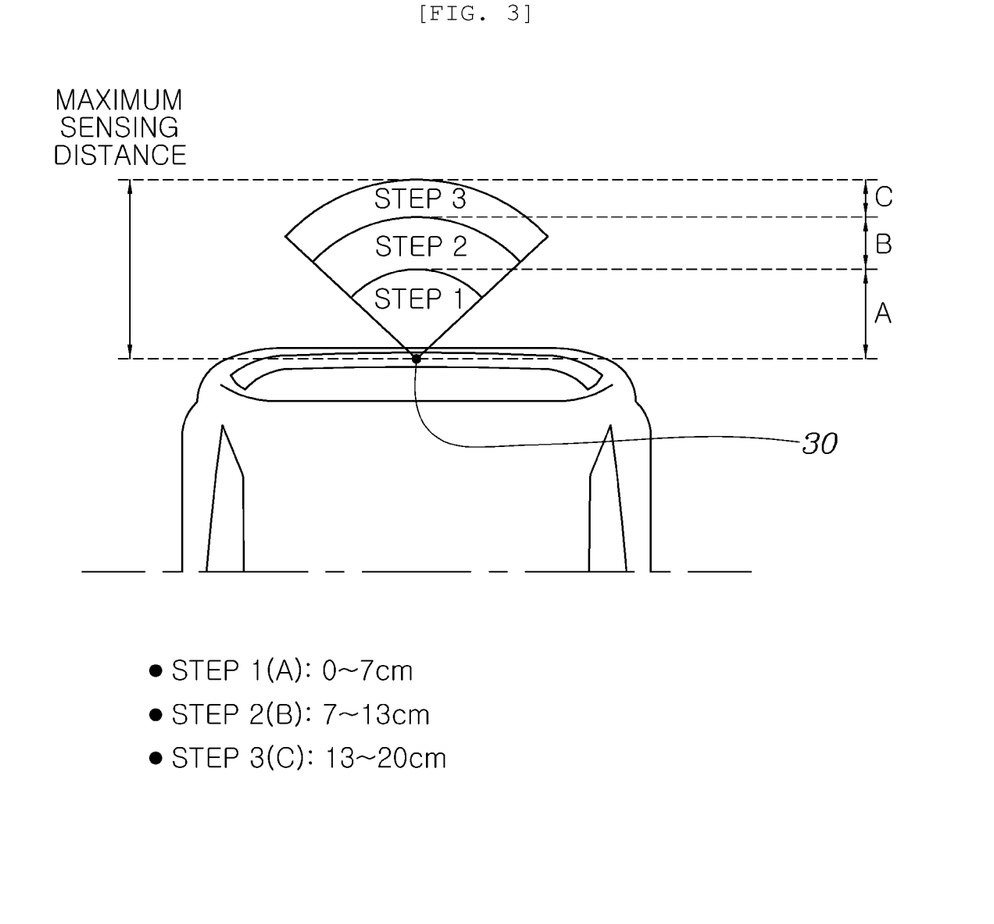
FIG. 3 is a view illustrating a maximum sensing distance and a sensing range of a sensor unit in a state where a tailgate according to the present disclosure is closed.

For example, the controller 100 may set a sensing range in which a distance to the object sensed by the ultrasonic sensor 30 is 0 to 7 cm to Step 1, set a sensing range in which a distance to the object sensed by the ultrasonic sensor 30 is 7 to 13 cm to Step 2, and set a sensing range in which a distance to the object sensed by the ultrasonic sensor 30 is 13 to 20 cm to Step 3.

That is, the controller 100 may open the tailgate 10 in a case where the object enters the sensing range of Step 2 from the sensing range of Step 3 and is sensed in the sensing range of Step 2.

In addition, the controller 100 may open the tailgate 10 in a case where the object enters the sensing range of Step 1 from the sensing range of Step 2 and is sensed in the sensing range of Step 1.

In addition, the controller 100 may control the door 10 so that the opening of the door 10 is stopped in a case where the object enters the maximum sensing distance of the sensor unit 30 and is sensed within the maximum sensing distance in a process in which the door 10 is opened.

For example, in a case where the object is sensed at the maximum sensing distance (an end portion of Step 3) that may be sensed by the ultrasonic sensor 30 in a process in which the tailgate 10 is opened, the controller 100 may stop the opening of the tailgate 10. Therefore, in a case where an obstacle is present in a vertical direction of the tailgate 10 at the time of opening the tailgate 10, the controller 100 may stop the opening of the tailgate 10 to prevent the tailgate 10 from colliding with the obstacle to be damaged.

In addition, the controller 100 may control the door 10 so that the opening of the door 10 is continued in a case where the object is not sensed in the maximum sensing range most distant from the sensor unit 30 and is preferentially sensed in the other sensing ranges in the process in which the door 10 is opened.

For example, when the object is not sensed at the maximum sensing distance (the end portion of Step 3) that may be sensed by the ultrasonic sensor 30 and is sensed in the sensing range of Step 1 or Step 2 in the process in which the tailgate 10 is opened, the controller 100 does not recognize the object as the obstacle to control the tailgate 10 so that the opening of the tailgate 10 may be continued.

Figure 4:
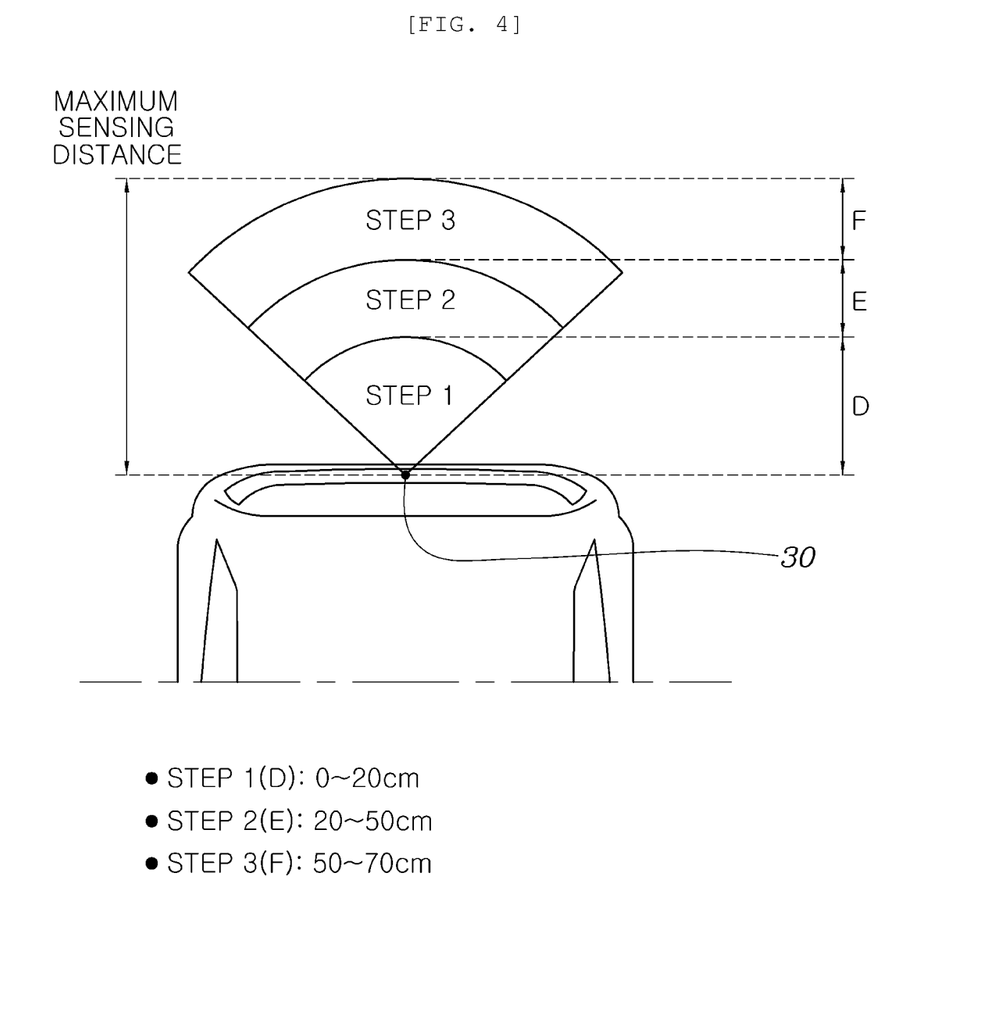
FIG. 4 is a view illustrating a maximum sensing distance and a sensing range of the sensor unit in a state where the tailgate according to the present disclosure is unlatched and opened.

In addition, the controller 100 may set a maximum sensing distance in a state where the door 10 is opened to be longer than that in a state where the door 10 is closed.

For example, in a case where the maximum sensing distance in a state where the tailgate 10 is closed is set to 20 cm, the controller 100 may set a maximum sensing distance in a state where the tailgate 10 is unlatched and opened to be 70 cm.

Therefore, sensing ranges divided within the maximum sensing distances are also different from each other. In detail, in the state where the tailgate 10 is closed, a sensing range of 0 to 7 cm may be set to Step 1, a sensing range of 7 to 13 cm may be set to Step 2, and a sensing range of 13 to 20 cm ma be set to Step 3, but in the state where the tailgate 10 is unlatched, a sensing range of 0 to 20 cm may be set to Step 1, a sensing range of 20 to 50 cm may be set to Step 2, and a sensing range of 50 to 70 cm ma be set to Step 3.

In the present disclosure, the maximum sensing distance to the object may be changed depending on the number of times of voltage application.

In detail, the maximum sensing distance of the sensor unit 30 is changed depending on the number of times of voltage application from the controller 100.

In addition, the controller 100 increases the number of times of voltage application to the sensor unit 30 in the state where the door 10 is opened as compared with the number of times of voltage application to the sensor unit 30 in the state where the door 10 is closed, such that the maximum sensing distance of the sensor unit 30 becomes long.

For example, in the state where the tailgate 10 is closed, the controller 100 applies a voltage of 3 V to the ultrasonic sensor 30 three times for one second, while in the state where the tailgate 10 is unlatched and opened, the controller 100 applies a voltage of 3 V to the ultrasonic sensor 30 nine times for one second.

That is, intensity of vibrations is changed depending on a difference in the number of times of voltage application to a diaphragm of the ultrasonic sensor 30 during the same time. The more the number of times of voltage application, the greater the vibrations, and the greater the vibrations, the greater the maximum sensing distance sensed by the ultrasonic sensor 30.

Therefore, the number of times of voltage application is increased in the state where the tailgate 10 is unlatched as compared with the state where the tailgate 10 is closed, such that the maximum sensing distance to the object may be increased. Accordingly, in the state where the tailgate 10 is closed, a user may open the tailgate 10 without making a large motion, while in a process in which the tailgate 10 is opened, it is possible to more certainly prevent a damage risk of the tailgate 10 in preparation for an obstacle present in an opening path of the tailgate 10.

In addition, the controller 100 may set the maximum sensing distance of the sensor unit 30 to become long when an operation signal of a door operator 60 operating the door 10 is input together with an unlatching signal of the door latch 50 in the state in which the door 10 is closed.

Here, the door latch 50 may be a latch 50 latching and unlatching the tailgate 10, and the door operator 60 may be a spindle drive 60 opening and closing the tailgate 10.

That is, the ultrasonic sensor 30 and the controller 100 transmit and receive signals through controller area network (CAN) communication. When the unlatching signal of the latch 50 and the operation signal of the spindle drive 60 are input to the controller 100, these signals are used as triggers, such that the maximum sensing distance of the ultrasonic sensor 30 is set to become long.

In addition, as another example, when the unlatching signal of the door latch 50 is input, the maximum sensing distance of the sensor unit 30 may be changed to be long, and when an operation signal of a door operator 60 operating the door 10 is input, the maximum sensing distance of the sensor unit 30 may be changed to be long.

Meanwhile, a method of controlling a door according to the present disclosure is configured to include a sensing step of sensing, by the sensor unit 30, an object adjacent to the outside of the door 10; a calculating step of calculating, by the controller 100, a distance at which the object is positioned on the basis of on a signal sensed by the sensor unit 30; and an operation controlling step of controlling, by the controller 100, the door 10 to be opened in a case where the distance to the object is gradually reduced in a state where the door 10 is closed, such that the object is sensed within a predetermined range.

In addition, the method of controlling a door according to the present disclosure further includes, after the calculating step, a range setting step of dividing and setting sensing ranges for each sensing distance of the sensor unit 30. In the operation controlling step, in a case where the object is sequentially sensed from a sensing range distant from the sensor unit 30 to a sensing range close to the sensor unit 30, the door 10 is controlled to be opened.

In addition, after the operation controlling step, in a case where the object enters the maximum sensing distance of the sensor unit 30 and is sensed within the maximum sensing distance in a process in which the door 10 is opened, the door 10 is controlled so that the opening of the door 10 is stopped.

However, after the operation controlling step, in a case where the object is not sensed in the maximum sensing range most distant from the sensor 30 and is preferentially sensed in the other sensing ranges in the process in which the door 10 is opened, the door 10 is controlled so that the opening of the door 10 is continued.

In addition, in the range setting step, a maximum sensing distance in a state where the door 10 is opened may be set to be longer than that in a state where the door 10 is closed.

Therefore, the maximum sensing distance of the sensor unit 30 is changed depending on the number of times of voltage application from the controller 100.

In addition, in the range setting step, the number of times of voltage application to the sensor unit 30 in the state where the door 10 is opened is increased as compared with the number of times of voltage application to the sensor unit 30 in the state where the door 10 is closed, such that the maximum sensing distance of the sensor unit 30 becomes long.

In addition, in the range setting step, when an operation signal of a door operator 60 operating the door 10 is input together with an unlatching signal of the door latch 50 in the state in which the door 10 is closed, the maximum sensing distance of the sensor unit 30 may be changed to be long.

As another example, in the range setting step, when the unlatching signal of the door latch 50 is input, the maximum sensing distance of the sensor unit 30 may be changed to be long, and when the operation signal of the door operator 60 operating the door 10 is input, the maximum sensing distance of the sensor unit 30 may be changed to be long.

Figure 5:
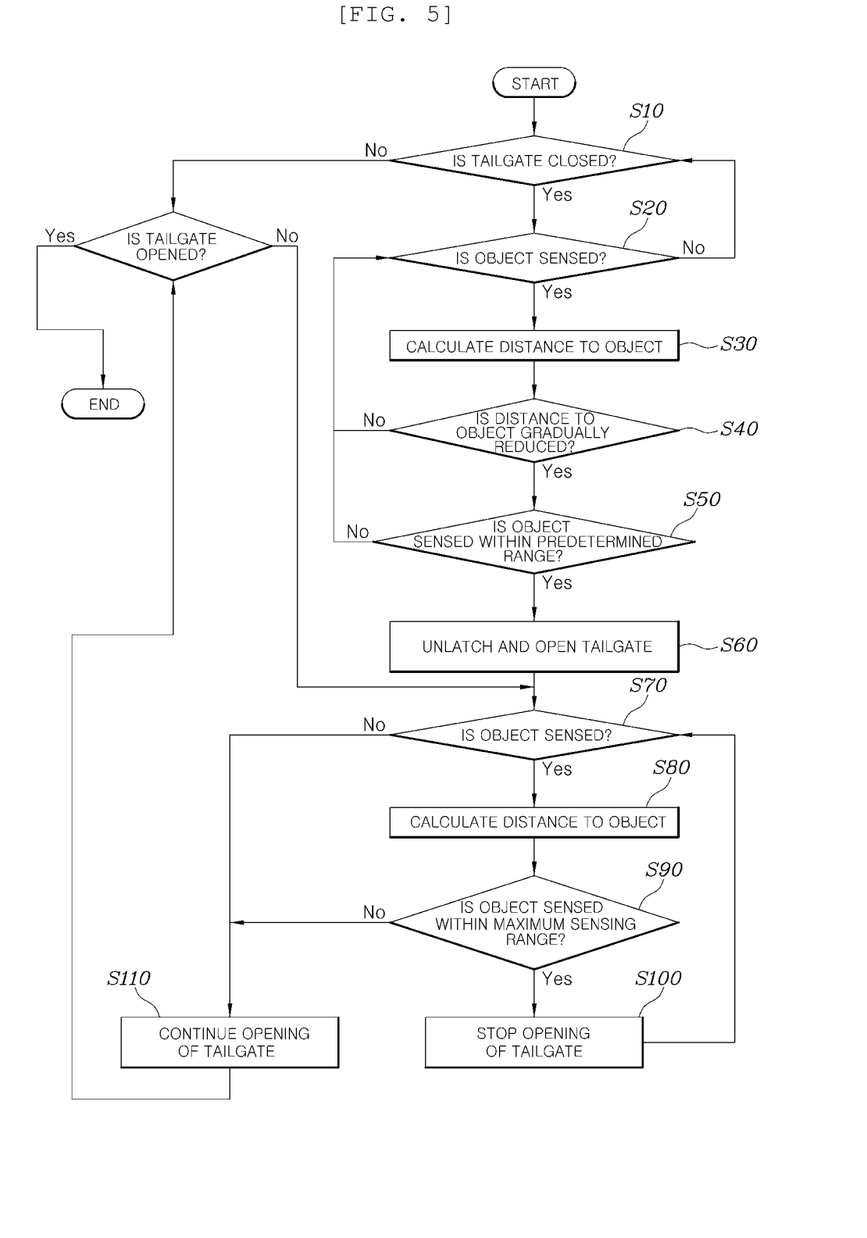
FIG. 5 is a flowchart for describing processes of controlling an operation of the tailgate according to the present disclosure.

Processes of controlling the tailgate 10 according to the present disclosure will be sequentially described with reference to FIG. 5. In a case where the tailgate 10 is closed (S10), it is determined whether or not the object is sensed through the ultrasonic sensor 30 (S20).

In a case where the object is sensed in S20, a distance to the object is calculated (S30).

Then, it is determined whether or not the distance to the object is gradually reduced (S40), it is determined whether or not the object is sensed within a predetermined range (S50) in a case where the distance to the object is gradually reduced, and the tailgate 10 is controlled to be opened while being unlatched (S60) in a case where these conditions are satisfied.

Then, it is determined whether or not the object is sensed through the ultrasonic sensor 30 in a process in which the tailgate 10 is opened (S70).

In a case where the object is sensed in S70, a distance to the object is calculated (S80).

Then, it is determined whether or not the object is sensed within the maximum sensing range (S90), and in a case where the object is sensed within the maximum sensing range, the opening of the tailgate 10 is stopped (S100).

However, in a case where the object is not sensed in S70 or in a case where the object is sensed within a range that is not the maximum sensing range in S90, the opening of the tailgate 10 is continued (S110).

Meanwhile, a method of implementing an unlatching function of the tailgate 10 according to the present disclosure will be described. A user brings his/her hand closer to the ultrasonic sensor 30 in a state where he/she holds a smart key and stands in front of the tailgate 10.

Therefore, in a case where a signal of Step 2 and a signal of Step 1 are sequentially input while the user's hand becomes gradually close to the ultrasonic sensor 30, the controller 100 determines that an unlatching operation condition is satisfied, such that control is performed so that the tailgate 10 and the latch 50 are unlatched and the spindle drive 60 is extended.

Also in a case where a signal of Step 3 and a signal of Step 2 are sequentially input while the user's hand becomes close to the ultrasonic sensor 30, the controller 100 may determine that the unlatching operation condition is satisfied.

Next, a method of implementing a function of sensing a rear obstacle after unlatching the tailgate 10 according to the present disclosure will be described by way of example. When a user holding a smart key opens the tailgate 10 in front of the tailgate 10, the latch 50 is unlatched and the spindle drive 60 is operated, such that the tailgate 10 starts to be opened.

Therefore, in a case where a signal of Step 3, which is the maximum sensing range, is input to the ultrasonic sensor 30 in a process in which the tailgate 10 is opened, it is determined that an operation stop condition in where collision is expected is satisfied, such that control is performed so that an operation of the spindle drive 60 is stopped, and an operation of the tailgate 10 is thus stopped.

However, in a case where a signal sensed by the ultrasonic sensor 30 in the process in which the tailgate 10 is opened is a signal of Step 2 or a signal of Step 1, it is determined that an operation stop condition in where collision is expected is not satisfied, such that the operation of the tailgate 10 may be continued.

Next, another method of implementing a function of sensing a rear obstacle after unlatching the tailgate 10 according to the present disclosure will be described by way of example. When a user opens the tailgate 10 through an operation of a tailgate opening switch provided in the vehicle interior, the latch 50 is unlatched and the spindle drive 60 is operated, such that the tailgate 10 starts to be opened.

Therefore, in a case where a signal of Step 3, which is the maximum sensing range, is input to the ultrasonic sensor 30 in a process in which the tailgate 10 is opened, it is determined that an operation stop condition in where collision is expected is satisfied, such that control is performed so that an operation of the spindle drive 60 is stopped, and an operation of the tailgate 10 is thus stopped.

However, in a case where a signal sensed by the ultrasonic sensor 30 in the process in which the tailgate 10 is opened is a signal of Step 2 or a signal of Step 1, it is determined that an operation stop condition in where collision is expected is not satisfied, such that the operation of the tailgate 10 may be continued.

As described above, in the present disclosure, the tailgate 10 is unlatched only by a motion of bringing the hand to the vicinity of the sensor unit 30, such that the unlatching operation of the tailgate 10 is easily and conveniently performed and a more luxurious vehicle image is implemented. In addition, the tailgate 10 is unlatched in a non-contact manner without directly touching the sensor unit 30, such that the unlatching operation of the tailgate 10 may be performed without repulsion even in a case where the tailgate 10 is contaminated.

In addition, the sensor unit 30 performs a function of a tailgate switch in the state where the tailgate 10 is closed and performs a function of a rear sensor sensing a rear obstacle in the process in which the tailgate 10 is opened. Therefore, the tailgate switch and the rear sensor are integrated with each other, such that a cost and a weight may be reduced.

As set forth above, according to the present disclosure, the tailgate is unlatched only by a motion of bringing the hand to the vicinity of the sensor unit, such that the unlatching operation of the tailgate is easily and conveniently performed and a more luxurious vehicle image is implemented.

In addition, the tailgate is unlatched in a non-contact manner without directly touching the sensor unit, such that the unlatching operation of the tailgate may be performed without repulsion even in a case where the tailgate is contaminated.

In addition, in a case where the obstacle is present in the vertical direction of the tailgate in the process in which the tailgate is opened, the obstacle is sensed through the sensor unit, such that the opening of the tailgate is stopped, thereby preventing the tailgate from colliding with the obstacle to be damaged.

Furthermore, the sensor unit performs the function of the tailgate switch in the state where the tailgate is closed and performs the function of the rear sensor sensing the rear obstacle in the process in which the tailgate is opened. Therefore, the tailgate switch and the rear sensor are integrated with each other, such that a cost and a weight may be reduced.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A method of controlling a door for a vehicle, the method comprising:
   sensing an object adjacent to a region outside of the door, wherein the sensing is performed by a sensor unit;
   calculating a distance between the object and the door based on a signal related to the sensing of the object;
   setting a range by dividing and setting sensing ranges for each sensing distance of the sensor unit, wherein setting the range comprises setting a maximum sensing distance in a state where the door is opened to be longer than in the state where the door is closed; and
   controlling the door to be opened when the distance to the object is gradually reduced in a state where the door is closed, such that the object is sensed within a predetermined range.

2. The method of claim 1, wherein the controlling comprises controlling the door to be opened when the object is sequentially sensed from a sensing range distant from the sensor unit to a sensing range close to the sensor unit.

3. The method of claim 2, further comprising controlling the door so that opening the door is stopped when the object enters the maximum sensing distance of the sensor unit while the door is being opened.

4. The method of claim 2, wherein the door continues to be opened as long as the object is not sensed in the maximum sensing distance most distant from the sensor unit or is sensed in other sensing ranges in a process during which the door is opened.

5. The method of claim 1, further comprising changing the maximum sensing distance of the sensor unit by applying a voltage a number of times, wherein, when setting the range, the number of times of the voltage is applied to the sensor unit in the state where the door is opened is increased as compared with the number of times of the voltage is applied to the sensor unit in the state where the door is closed, such that the maximum sensing distance of the sensor unit becomes longer.

6. The method of claim 1, wherein setting the range comprises changing the maximum sensing distance to be longer when an operation signal of a door operator operating the door is input.

7. A method of controlling a door for a vehicle, the method comprising:
sensing an object adjacent to a region outside of the door, wherein the sensing is performed by a sensor unit;
calculating a distance at which the object is positioned based on a signal related to the sensing of the object;
setting a range by dividing and setting sensing ranges for each sensing distance of the sensor unit, wherein setting the range comprises setting a maximum sensing distance in a state where the door is opened to be longer than that in a state where the door is closed and changing the maximum sensing distance to be longer when an operation signal of a door operator operating the door is input together with an unlatching signal of a door latch in the state when the door is closed; and
controlling the door to be opened when the distance to the object is gradually reduced in a state where the door is closed, such that the object is sensed within a predetermined range, wherein the controlling comprises controlling the door to be opened when the object is sequentially sensed from a sensing range distant from the sensor unit to a sensing range close to the sensor unit.

8. The method of claim 7, further comprising controlling the door so that opening the door is stopped when the object enters the maximum sensing distance of the sensor unit while the door is being opened.

9. The method of claim 7, wherein the door continues to be opened as long as the object is not sensed in the maximum sensing distance most distant from the sensor unit or is sensed in other sensing ranges in a process during which the door is opened.

10. The method of claim 7, wherein changing the maximum sensing distance of the sensor unit comprises applying a voltage a number of times.

11. The method of claim 10, wherein the number of times of the voltage is applied to the sensor unit in the state where the door is opened is increased as compared with the number of times of the voltage is applied to the sensor unit in the state where the door is closed so that the maximum sensing distance of the sensor unit becomes longer.

12. A method of controlling a door for a vehicle, the method comprising:
sensing an object adjacent to a region outside of the door, wherein the sensing is performed by a sensor unit;
calculating a distance at which the object is positioned based on a signal related to the sensing of the object;
setting a range by dividing and setting sensing ranges for each sensing distance of the sensor unit, wherein setting the range comprises setting a maximum sensing distance in a state where the door is opened to be longer than that in a state where the door is closed and changing the maximum sensing distance to be longer when an unlatching signal of a door latch is input; and
controlling the door to be opened when the distance to the object is gradually reduced in a state where the door is closed, such that the object is sensed within a predetermined range, wherein the controlling comprises controlling the door to be opened when the object is sequentially sensed from a sensing range distant from the sensor unit to a sensing range close to the sensor unit.

13. The method of claim 12, wherein setting the range comprises applying a voltage to the sensor unit a number of times.

14. The method of claim 13, wherein, when setting the range, the number of times of the voltage is applied to the sensor unit in the state where the door is opened is increased as compared with the number of times of the voltage is applied to the sensor unit in the state where the door is closed, such that the maximum sensing distance of the sensor unit becomes longer.

15. The method of claim 12, further comprising controlling the door so that opening the door is stopped when the object enters the maximum sensing distance of the sensor unit while the door is being opened.

16. The method of claim 12, wherein the door continues to be opened as long as the object is not sensed in the maximum sensing distance most distant from the sensor unit or is sensed in other sensing ranges in a process during which the door is opened.

17. The method of claim 16, wherein changing the maximum sensing distance of the sensor unit comprises applying a voltage a number of times.

18. The method of claim 17, wherein the number of times of the voltage is applied to the sensor unit in the state where the door is opened is increased as compared with the number of times of the voltage is applied to the sensor unit in the state where the door is closed so that the maximum sensing distance of the sensor unit becomes longer.

* * * * *